United States Patent [19]

Harte

[11] Patent Number: 4,521,199

[45] Date of Patent: Jun. 4, 1985

[54] COMPUTER ASSISTED TEACHING MACHINE THAT USES TWO SETS OF CONDUCTIVE STRIPS

[76] Inventor: J. Richard Harte, 10 West Concord, Kansas City, Mo. 64112

[21] Appl. No.: 554,692

[22] Filed: Nov. 23, 1983

[51] Int. Cl.³ .............................................. G09B 7/06
[52] U.S. Cl. ................................................. 434/339
[58] Field of Search .............. 434/339, 334, 335, 338, 434/340, 320

[56] References Cited

U.S. PATENT DOCUMENTS

| | | | |
|---|---|---|---|
| 2,843,695 | 7/1958 | Osuch et al. | 200/86 R |
| 2,997,793 | 8/1961 | Kelly | 434/339 |
| 3,056,005 | 11/1962 | Larsen | 200/86 R |
| 3,106,027 | 10/1963 | Thelen | 434/339 |
| 3,206,871 | 9/1965 | Schure et al. | 434/338 X |
| 3,308,253 | 3/1967 | Krakinowski | 200/86 R X |
| 3,421,231 | 1/1969 | Kane | 434/339 |
| 3,520,074 | 7/1970 | Severin et al. | 434/334 X |
| 3,579,857 | 5/1971 | Lamberson | 434/339 |
| 3,747,229 | 7/1973 | Harte | 434/334 |
| 3,902,255 | 9/1975 | Harte | 434/334 |
| 3,947,978 | 4/1976 | Clark et al. | 434/339 |
| 3,949,489 | 4/1976 | Gallucci | 434/338 |
| 3,964,176 | 6/1976 | Harte | 434/334 |
| 4,010,553 | 3/1977 | Bennett | 434/338 |
| 4,065,858 | 1/1978 | Harte | 434/334 |
| 4,069,597 | 1/1978 | Bigorre | 434/340 |
| 4,114,876 | 10/1978 | Brilakis | 434/335 |
| 4,164,078 | 8/1979 | Goldfarb | 434/335 |
| 4,453,920 | 6/1984 | Harte | 434/334 |

Primary Examiner—William H. Grieb
Attorney, Agent, or Firm—D. A. N. Chase; Michael Yakimo, Jr.

[57] ABSTRACT

This invention provides immediate feedback to students as to their correct and incorrect responses by the incorporation of: a computer; electronic visual and/or audio feedback means; and a holding frame that contains a printed instructional sheet that is located above two sets of electroconductive strips, where the first set is located at a 90° axis with the second set, and overlies the second set in a different but parallel plane. The centers of the conductive strips form the vertical and horizontal coordinates of a grid pattern. The instructional sheets contain response areas that are located above some of the points of intersection of the coordinates in this grid. Each strip in the two sets of conductive strips is connected to the computer, and the computer is programmed to know which points of intersection are correct response areas and which are incorrect response areas. At least one set of conductive strips is flexible or elastic. The two sets of conductive strips are normally held apart until downward pressure is exerted at a response area. This downward pressure causes a switching action that indicates to the computer the exact point in the grid at which the pressure was exerted. The computer processes this information and sends immediate feedback to the student as to the correctness or incorrectness of his response, and stores this information in its memory for later feedback or analysis.

11 Claims, 18 Drawing Figures

COMPUTER ASSISTED TEACHING MACHINE THAT USES TWO SETS OF CONDUCTIVE STRIPS

PRIOR ART

| | | |
|---|---|---|
| Osuch and Krake | 2,843,695 | Harte, |
| Kelley | 2,997,793 | 4,453,920 |
| Larsen | 3,056,005 | Harte, pending patent application |
| Thelen | 3,106,027 | Ser. No. 633,578, filed July 23, 1984 |
| Schure et al | 3,206,871 | |
| Krakinowski | 3,308,253 | |
| Kane | 3,421,231 | |
| Severin | 3,520,074 | |
| Lamberson | 3,579,857 | |
| Clark | 3,947,978 | |
| Gallucci | 3,949,489 | |
| Bennett | 4,010,553 | |
| Bigorre | 4,069,597 | |
| Brilakis | 4,114,876 | |
| Goldfarb | 4,164,078 | |

Harte, pending patent application, Ser. No. 540,636, Title: Computer Assisted Instructional and Testing Apparatus With Switch Closure at Two Different Depths, Ser. No. 540,636, filed Oct. 11, 1983.

SUMMARY OF THE DISCLOSURE

This invention is an improvement in instructional and testing apparatus of the type that provides immediate feedback to students as to their correct and incorrect responses, and incorporates a computer as a way of recording and processing a students responses. It is similar to the disclosure cited in the Prior Art under Harte, Ser. No. 540,636, except that one version of this application is of simpler construction, and is therefore less expensive to produce, and is apt to have fewer maintenance problems.

In Ser. No. 540,636, cited in the Prior Art, I have introduced the use of elastic and electroconductive strips to form a grid pattern, where the points of intersection in the grid can be defined by horizontal and vertical coordinates. In Ser. No. 540,636, a program in the computer's memory store can be told which of these points on the grid represent correct responses, and which points on the grid represent incorrect responses. In Ser. No. 540,636, two different elastic and electroconductive sheets each lie above a set of conductive strips. The two different elastic and electroconductive sheets, and the two sets of conductive strips lie in different but parallel planes. One set of conductive strips is located at a 90° axis with the second set of conductive strips. In Ser. No. 540,636, each elastic and conductive sheet is individually energized by an electric power source, and downward pressure at a response area on or in an instructional sheet causes downward pressure on the top conductive sheet which contacts one of the strips in the first set; and continuing downward pressure at this response area causes the second elastic and conductive sheet to contact one of the conductive strips that underlies this sheet. This causes two switching actions to occur, and the site on the grid, as defined by the centers of vertical set of strips and the centers of the horizontal set of strips, where this switching action occurred is relayed to the computer by wires and relay switches. The computer's memory has been previously programmed to know which points of intersection on the grid are correct response areas, and which are incorrect response areas. The computer evaluates this response, and sends immediate feedback to the student as to the correctness or incorrectness of their response. The computer also retains this information in it's memory for later evaluation, analysis, and feedback. In the testing mode, the computer does not send immediate feedback to the student, but provides the information to the instructor on command.

This disclosure, though similar to Ser. No. 540,636 in many respects, presents downward pressure on an electroconductive and elastic strip to contact an underlying electroconductive medium as the way of locating one or more of the grid coordinates. Thus, this case, Ser. No. 554,692, differs from Ser. No. 540,636, which emphasized downward pressure on a conductive sheet contacting a conductive strip, and energizing the conductive strip to close an electric switch which relays this information to a computer to define one of the grid coordinates, and further downward pressure then forces a second elastic and conductive sheet to contact a second strip in a different set of conductive strips to define the second grid coordinate.

This disclosure, Ser. No. 554,692, emphasizes the reverse pattern of switch closure from that illustrated and described in Ser. No. 540,636. In this invention, the primary feature is the downward deflection of an elastic and conductive strip to contact other conductive material to result in a switching action that helps locate one or more of the grid coordinates. Four different variations of this invention are illustrated, described, and claimed with this application. In the first variation of this invention, which includes FIGS. 1 through 5; one elastic and conductive strip is deflected downward by pressure at a response area, and this strip contacts one of the conductive strips in a second set of strips that is located at 90° to the first set and lies under the first set. The second variation is presented in FIGS. 6 through 10; and in this second variation, the two different sets of elastic and conductive strips have one member of each set deflected downward to contact an underlying conductive sheet when downward pressure is applied at a response area in an instructional sheet. The third variation of this invention is presented in FIGS. 11 through 14; and in this variation, an elastic and conductive sheet is located between the two different sets of electroconductive strips. In this third variation, downward pressure on an elastic and conductive strip at a response area on an instructional sheet causes this conductive strip to contact the elastic and conductive sheet; and continued downward pressure causes this conductive sheet to contact one of the conductive strips in an underlying set of conductive strips. This third variation has the advantage that the elastic and conductive sheet that is sandwiched between the two sets of conductive strips can be the source of electric power to both sets of conductive strips. The fourth variation of this invention is presented in FIGS. 15 through 18, and is similar to the first variation noted above, except that in this fourth variation, the top elastic sheet is electroconductive, can carry a low voltage current, and serves as the source of electric current that is transmitted to one strip in the first set of conductive strips, and that with further pressure in a downward direction, this first strip is further deflected downward to contact one of the strips in the second set of strips, there by closing two sets of circuits that locate the two coordinates of that particular response area.

All four variations of this invention use the concept of downward deflection of an elastic and electroconductive strip to close one or more electric circuits that help locate coordinates on a grid, and that relay this information to a computer that is programmed to identify which of the points of intersection of the coordinates of a grid is a correct response area and which is an incorrect response area. An instructional sheet is constructed so that it has a plurality of response areas printed on or punched in it. These response areas have the same centers as the points of intersection of the coordinates of the grid, or as the centers of the two different sets of conductive strips that underlie the instructional sheet. When one or more electric circuits are closed that identify the site of downward deflection, this information is relayed to a computer, which then compares this information with its program to determine if this is a correct or an incorrect response. Information about the correctness or incorrectness of response is then fed back to the student and is also retained in memory for later evaluation, analysis, or feedback.

BACKGROUND AND OBJECT OF THE INVENTION

This invention relates to an improvement in instructional and testing apparatus noted in the prior art. Computers and related hardware and software have become less expensive in recent years. The present invention provides a way that the classroom teacher can utilize a much simpler teaching machine that gives the student immediate feedback as to correct and incorrect responses, and then use these same instructional sheets on a teaching machine that is linked to a computer. This simpler teaching machine is currently being produced under U.S. Pat. Nos. 3,474,229; 3,964,176; 3,902,255; and 4,065,858. When this Computer Assisted Teaching Machine That Uses Two Sets of Conductive Strips is designed and built to utilize the same instructional sheets that are currently being used on the much simpler teaching machine, then a teacher can have her students practice on the simpler teaching machine, and after they have sufficiently mastered the material on the instructional sheets, they can then place the same sheet, or a sheet covering the same subject material on the Computer Assisted Teaching Machine and obtain a print out record of their performance, and the teacher can at any time request that the computer print out a record of any given student's performance. The computer can also be programmed to perform various analytic and evaluative processes on the data it has on a given student, and on the students in a given class or in a given school or school district. By having the Computer Assisted Teaching Machine's computer programmed to not give the student immediate feedback, it can be changed to the testing mode, rather than the teaching mode.

DETAILED DESCRIPTION OF THE INVENTION

Figures 1, 2:
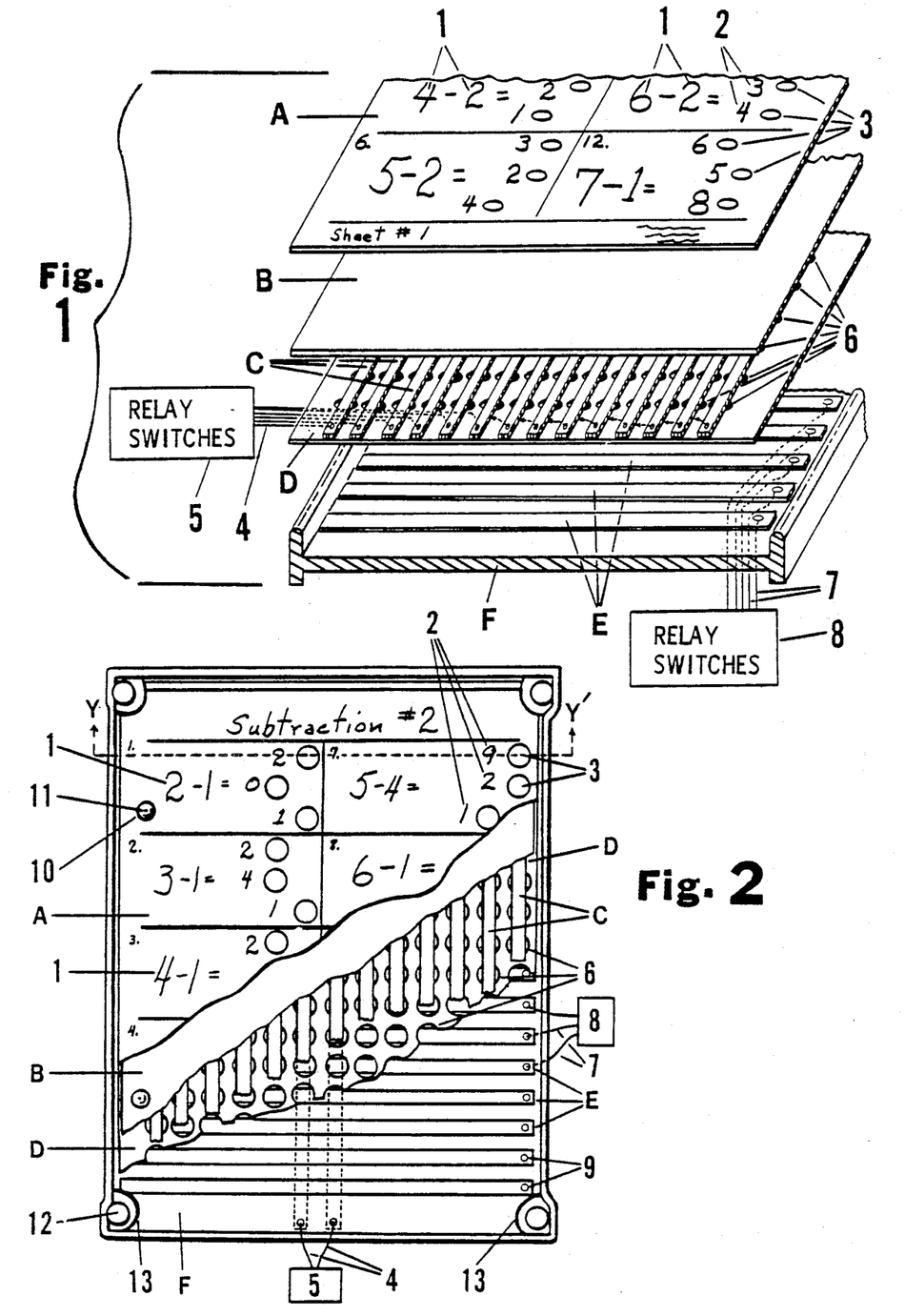
FIG. 1 is an exploded view of the first variation of this invention, a computer assisted teaching machine.
FIG. 2 is a plan view of the first variation of this teaching machine with different components partly cut away to reveal relationships of some of the different parts.

The first variation of this invention is illustrated in FIGS. 1 through 5. FIG. 1 shows an exploded view of this first variation and illustrates the top to bottom relationships of some of the component parts. In FIGS. 1, 2, 3, and 4; A is an instructional sheet which is easily inserted and removed from the upper surface which is the working surface of the teaching machine. Instructional sheet A can be printed with an infinite variety of questions of multiple choice, cross-matching, or true false variety. Near each of these questions 1, is printed a number of possible correct answers 2. For each question 1, only one of the possible correct answer choices 2, is the correct answer. Near each possible coorect answer 2, is printed or punched a response area 3. The centers of all response areas 3, are precisely located to conform with the points of intersection of the vertical and horizontal coordinates of an underlying grid pattern formed by the centers of two different sets of electroconductive strips. In FIGS. 1, 2, 3, and 4; B is an elastic and non-conductive sheet that is permanently fixed over the other components in holding Frame F. Sandwiched between non-conductive sheet B and non-conductive sheet D, are a series of conductive strips C that are elastic and are arranged in a parallel manner. The centers of conductive strips C form one of the sets of coordinates for a grid pattern. Attached to each conductive strip C is a wire 4, that connects this strip C, to a relay switch 5. Nonconductive sheet D contains through holes 6, that are arranged with their centers having the same centers as the grid pattern formed by the two set of conductive strips. Sandwiched between nonconductive sheet D, and the upper surface of holding frame F, are conductive strips E, that are permanently attached to the upper surface of holding frame F. The centers of conductive strips E form the second set of coordinates of the grid pattern. Attached to each conductive strip E is a wire 7, that connects this strip E to a relay switch 8. Alternatively, a pattern other than a grid may be employed and the conductive strips may be other than straight, such as curved, V-shaped, zig-zag configuration or undulating.

FIG. 2, illustrates additional details of this first variation of this invention by showing a plan view with some of the component parts partly cut away to reveal the top to bottom relationships of some of the component parts. In FIG. 2, conductive strips E are attached to wires 7, by fasteners 9, and instructional sheets A are shown to have positioning holes 10, that fit over positioning pegs 11 that are a permanent part of holding frame F. At each of the four corners of holding frame F are corner posts 12, that have a slot 13, at their base. Slots 13 in conjunction with positioning pegs 11, enable instructional sheets A to be easily, rapidly, and accurately positioned and removed from the upper surface of the teaching machine.

Figure 3:
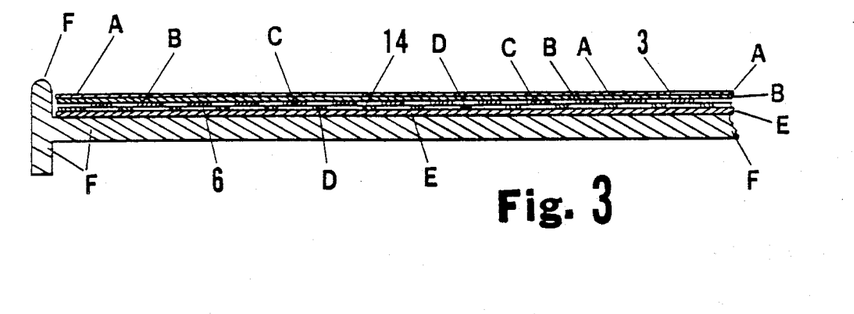
FIG. 3 is a cross sectional view along broken line Y—Y' in FIG. 2, and shows the top to bottom positional relationships of the component parts shown in FIG. 2.

FIG. 3, is a cross sectional view along broken line Y—Y' in FIG. 2, that shows the top to bottom relationships of the previously described component parts. In FIG. 3, 14 is a space between conductive strips C.

Figure 4:
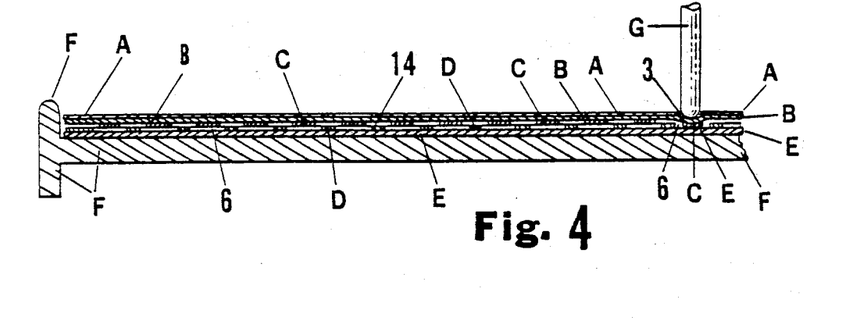
FIG. 4 is identical with FIG. 3, except it shows a stylus pressing down at a response area in an instructional sheet to close an electric circuit when a top conductive strip is pushed down to contact one of the bottom conductive strips.

FIG. 4, is identical to FIG. 3, but in addition, it shows a stylus G, being pushed downward at a response area 3, in an instructional sheet A, to deflect an elastic and conductive strip C downward through a hole 6, in non-conductive sheet D, to contact a conductive strip E to close an electric circuit that precisely located this response area 3 in the grid of coordinates formed by the two sets of conductive strips. Information about this precise location is transmitted to a computer via wires 4 and 7 and relay switches 5 and 8. Information about the correctness or incorrectness of this particular response is then fed back to the student via computer hardware.

Figure 5:
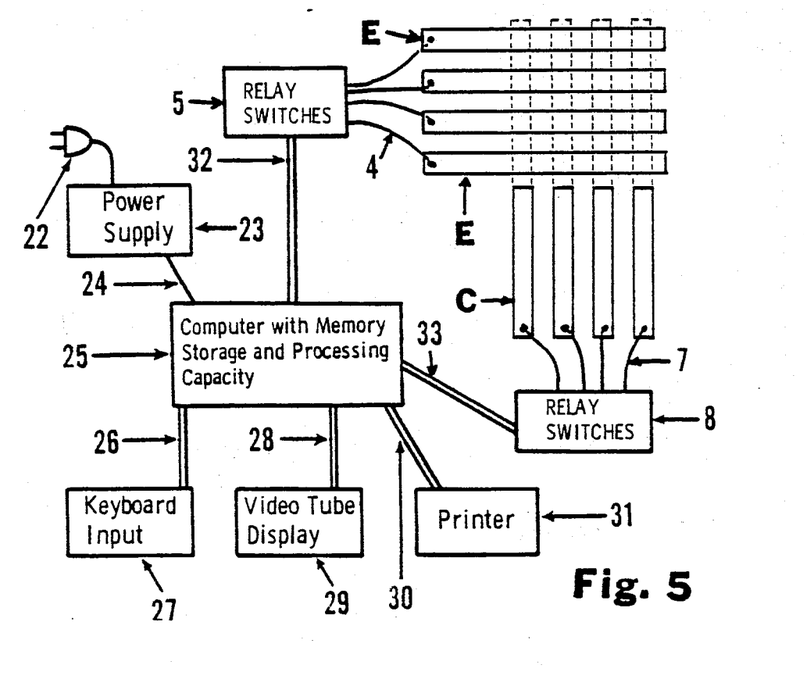
FIG. 5 is a schematic diagram that shows how the different electrical components in this first variation are linked to the other components.

FIG. 5, is a schematic diagram that illustrates how conductive strips C and E are positioned to form a grid pattern that presents a multiplicity of switching choices, and how these two sets of conductive strips are connected to the other components by: wires 4 and 7; relay switches 5 and 8; cables 32 and 33; and by computer 25. Power source 22, energizes power supply 23, that furnishes electric power to computer 25 and other components by cable 24. The other components include such computer hardware as: keyboard input 27; video tube display 29; printer 31; and cables 26, 28, and 30, which connect these hardware components with the computer. Keyboard 27 can program the computers memory store to know which points in the grid pattern are correct response areas, and which are incorrect response areas. Keyboard 27, is also used to inform the computer as to which student is using the computer assisted teaching apparatus, and also to inform the computer as to which instructional sheet A, is being used at this particular time by this particular student. Video tube display 29, and printer 31, give feedback to the student as to his correct and incorrect responses, and can also give information stored in the computers memory about a student's performance to the instructor on command by the instructor. Video tube display 29 may also contain a means of audio feedback to the student as does the ordinary television set. Computer 25, may also be linked with other computer hardware such as disc storage hardware, or tape storage hardware, that permit a greater amount of information to be collected, and in time evaluated and analyized for a variety of educational, research, and administrative purposes.

Figure 6:
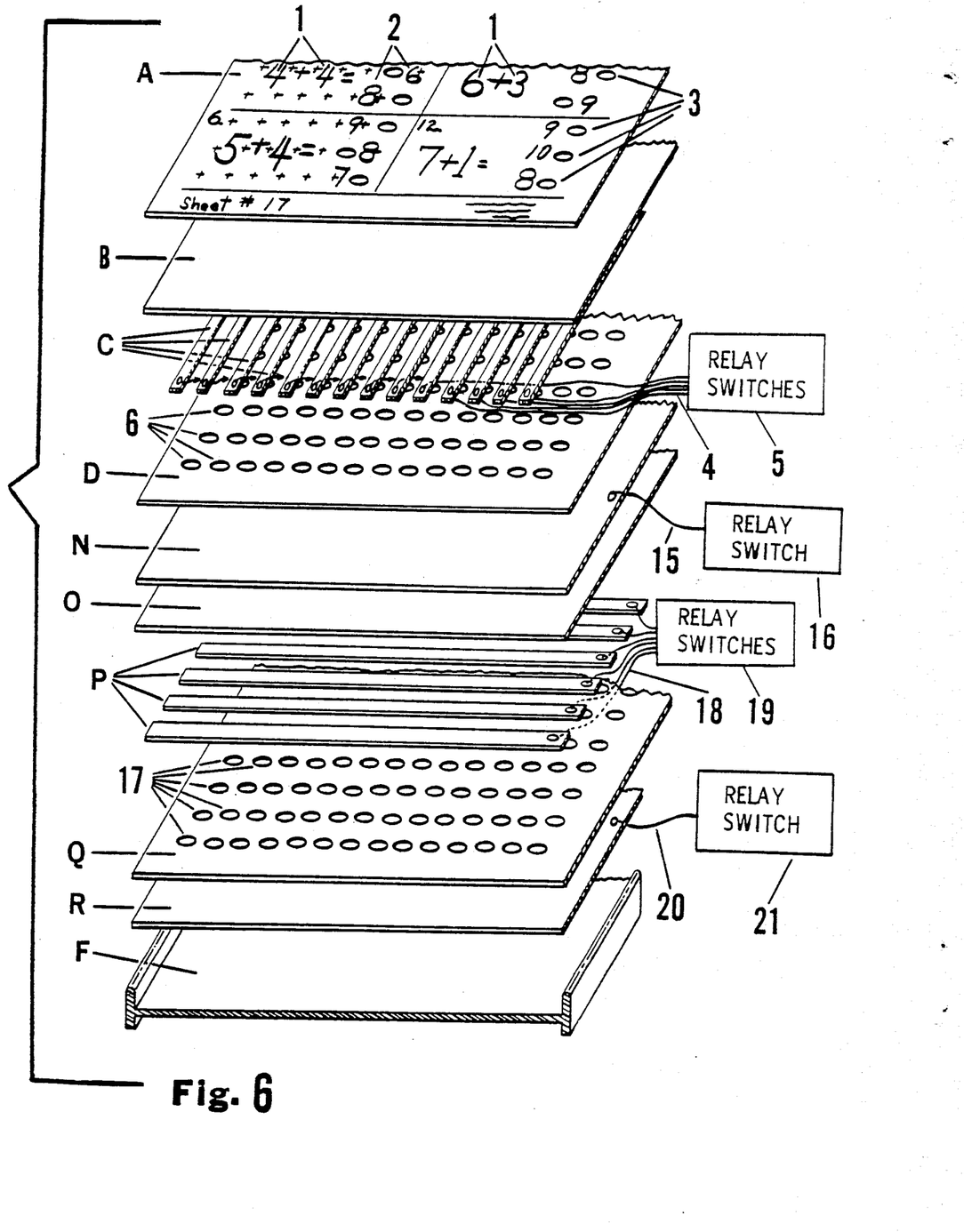
FIG. 6 is an exploded view of the second variation of this invention, a computer assisted teaching machine.
Figure 7:
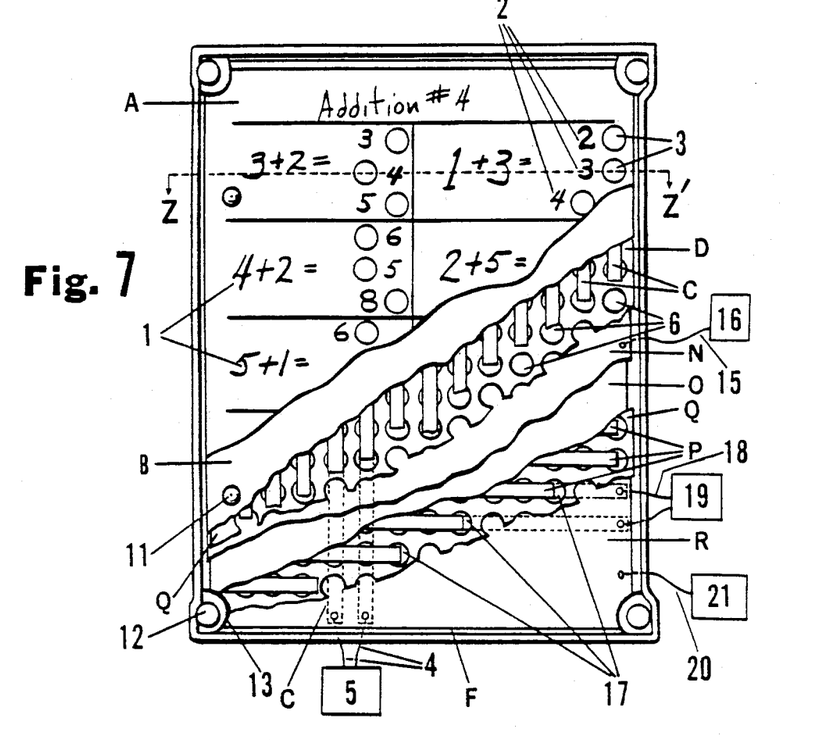
FIG. 7 is a plan view of this second variation of this computer assisted teaching machine, with different components partly cut away to reveal relationships of some of the component parts.
Figure 8:
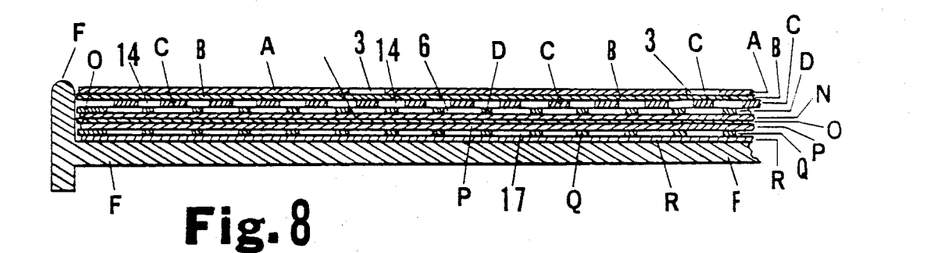
FIG. 8 is a cross sectional view along line Z—Z' in FIG. 7, and shows top to bottom positional relationships of some of the different component parts in this second variation of this invention.
Figure 9:
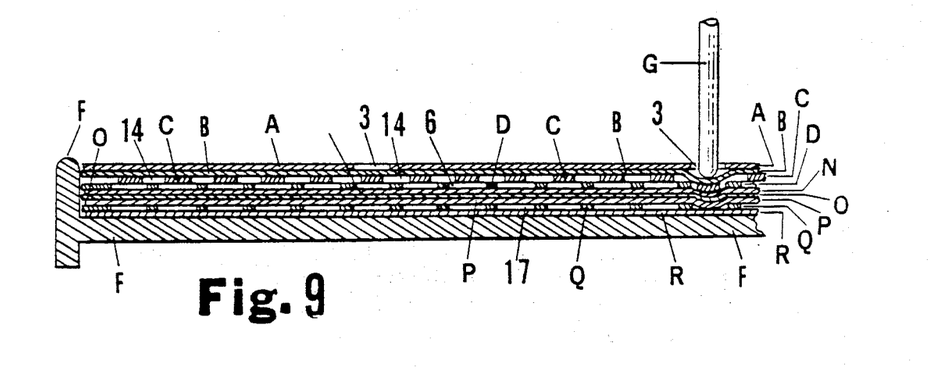
FIG. 9 is identical to FIG. 8 except it shows a stylus pressing down at a response area in an instructional sheet, said downward pressure resulting in two different conductive strips being pushed downward to contact an underlying conductive sheet, there by completing two electric circuits.

FIG. 6, shows an exploded view of the second variation of this invention.

FIGS. 6, 7, 8, 9, and 10, illustrate how this second variation of this invention is similar to and also how it differs from the first variation of the invention that is illustrated in FIGS. 1 through 5. Only the differences will be described in the following paragraph that describes this second variation of this invention.

Figure 10:
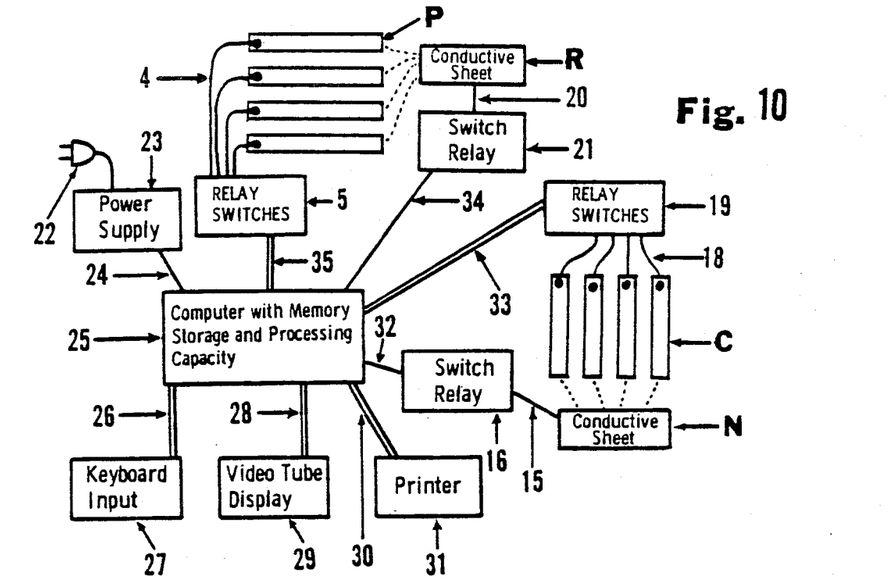
FIG. 10 is a schematic diagram that shows how the different electrical components of this second variation are linked with each other and with the computer and related hardware.

FIGS. 6, 7, 8, 9, and 10, illustrate that in this second variation, that elastic and conductive strips in two sets, set C and set P, are deflected in a downward direction by a stylus G, to pass through holes 6 and 17 in nonconductive sheets D and Q, to contact underlying conductive sheets N and R respectively, there by closing two electric circuits that locate the precise point on the grid of coordinates where stylus G pushed through a response area 3, on an instructional sheet A. An elastic and nonconductive sheet O, separates conductive sheet N, from conductive strips P. Sheet Q, contains holes 17, that have the same centers as holes 6, in nonconductive sheet D. Sheet R is conductive, and is permanently attached to the upper surface of holding frame F. All of the components except instructional sheet A are held in position within holding frame F by conventional means. FIG. 10, illustrates the relationships of the different electrical components of this second variation of this invention; where conductive strips C can be depressed to contact conductive sheet N, and where conductive strips P can be depressed to contact conductive sheet R; and where these conductive strips in sets C and P, and conductive sheets N and R are connected to Computer 25 and associated hardware by Wires: 4, 18, 15, and 20; and by relay switches: 5, 19, 21, and 16; and by cables: 32, 33, 34, and 35. The other features of this second variation of this invention are identical with the features described in the paragraphs describing the first variation.

Figure 11:
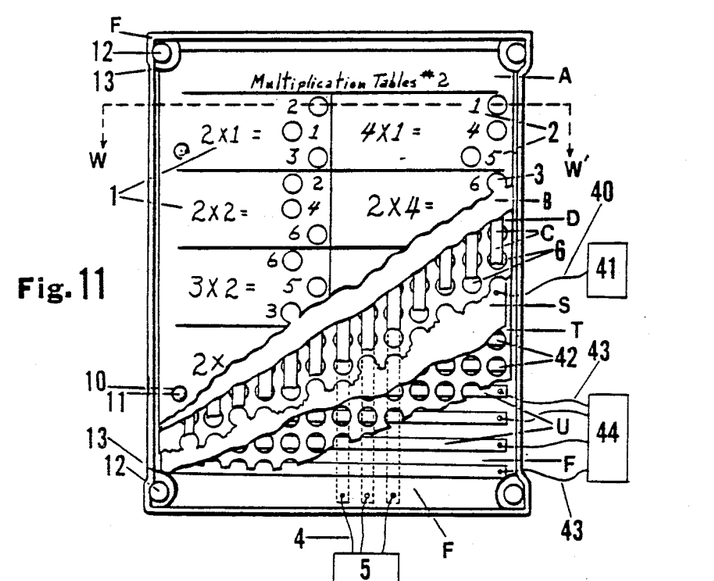
FIG. 11 is a plan view of the third variation of this computer assisted teaching machine, with different components partly cut away to reveal relationships of some of the different components.
Figure 12:
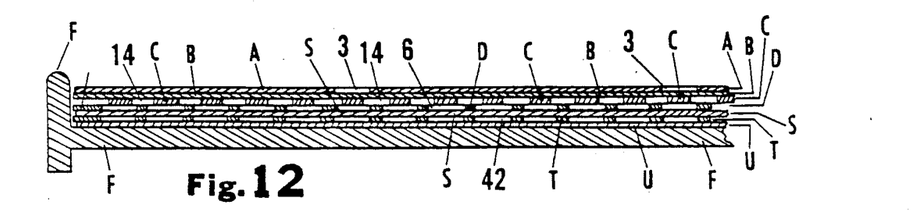
FIG. 12 is a cross sectional view along broken line W—W' in FIG. 11 and shows the top to bottom positional relationships of the component parts shown in FIG. 12.
Figure 13:
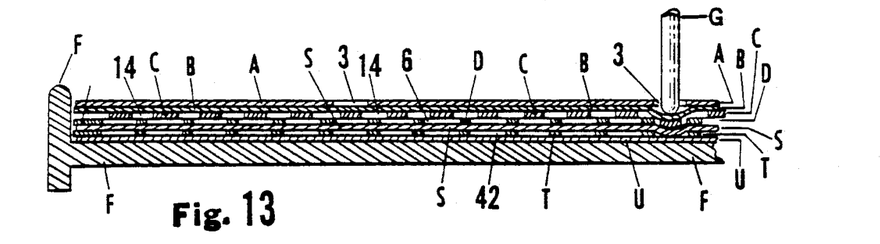
FIG. 13 is identical to FIG. 12 except that is shows a stylus pressing down at a response area in an instructional sheet to close electric circuits when an elastic and conductive strip is pressed downward against an elastic and conductive sheet, which in turn is pressed down to contact a second conductive strip, there by closing two electric circuits.
Figure 14:
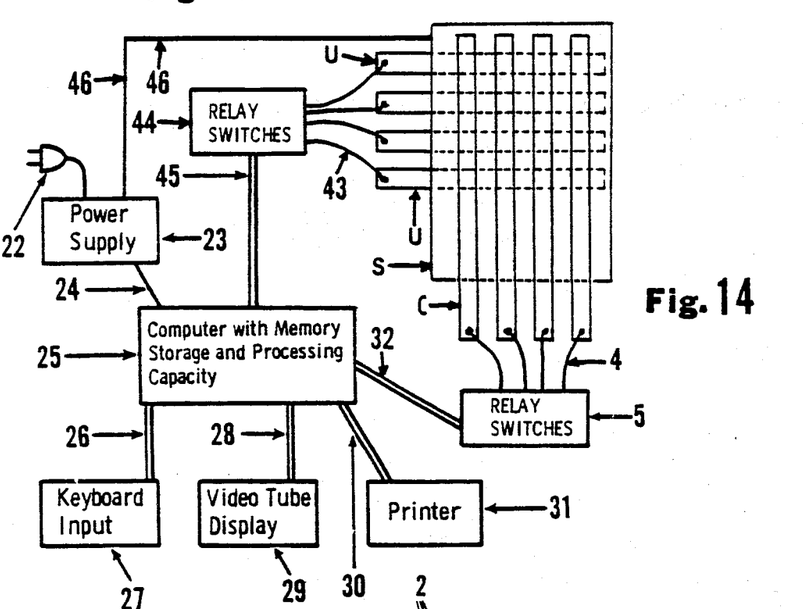
FIG. 14 is a schematic diagram that shows how the different electrical components of this third variation of this invention are linked to the other components.

FIG. 11, shows a plan view of the third variation of this invention, and shows some of the component parts cut away to reveal the relationships of some of the different component parts.

FIGS. 11, 12, 13, and 14; illustrate how this third variation is similar to the first and second variations, and also illustrate how this third variation is different. Only the differences will be described in the following paragraph that describes this third variation of this invention.

FIGS. 11, 12, 13, and 14; show that the primary feature of this third variation is that an electroconductive sheet S, is sandwiched between the two set of electroconductive strips, set C, and set U and that downward pressure by a stylus G, at a response area 3, in an instructional sheet A, causes one member of conductive strips C to be deflected downward to contact conductive sheet S, and that continued downward pressure on stylus G, causes conductive sheet S to contact one of the conductive strips in set of conductive strips U, there by closing two electric circuits that locate the precise point in the grid of coordinates at which stylus G was pressed downward. Sheet T is nonconductive and contains a a grid of through holes 42, that have the same centers as holes 6 in sheet D. Nonconductive sheets D and T keep electroconductive strips D and U, and conductive sheet S, separated except at such times as when downward pressure from a stylus G causes a deflection of a conductive strip from set of conductive strips C to contact conductive sheet S after passing through a hole 6, and causes conductive sheet S to be deflected through a hole 42 to contact one of the conductive strips in set of conductive strips U. When these electroconductive members contact each othe information about the circuits that have been closed are sent to computer 25, by way of: wires: 4 and 43; relay switches 5 and 44; and cables 32 and 45. Wire 46 supplies electric power to conductive sheet S. This arrangement in this third variation of this invention provides for a similar, or in many respects identical pattern of operation to variations one and two, when this third variation is used in conjunction with computer 25, and related hardware which includes keyboard input 27, video tube display 29, and printer 31; in conjunction with connecting cables: 26, 28, and 30.

Figure 15:
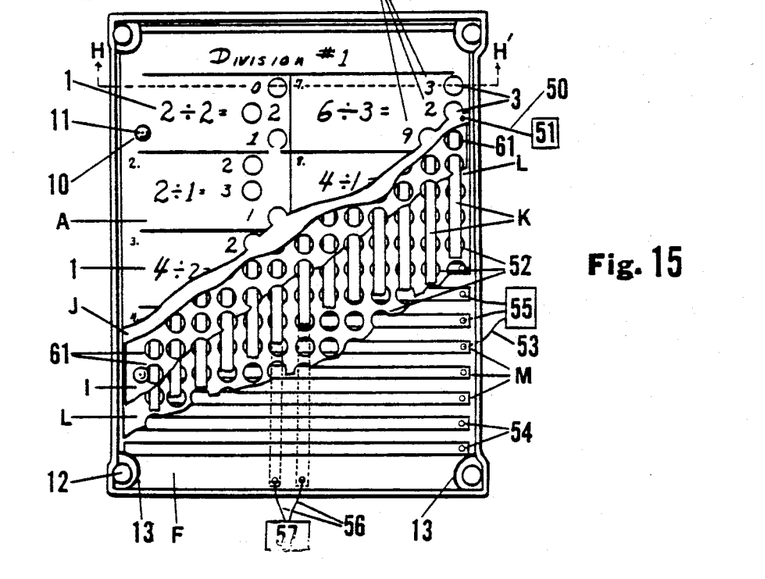
FIG. 15 is a plan view of the fourth variation of this invention; this variation is similar to the first variation, except that in this fourth variation the top elastic sheet is conductive, and is a source of electric power flow to both sets of conductive strips when a stylus depresses this sheet sufficiently to make contact with the conductive strips.

FIG. 15, shows a plan view of the fourth variation of this invention, and shows some of the component parts cut away to reveal the relationships of some of the different component parts in this fourth variation.

Figures 16, 17:
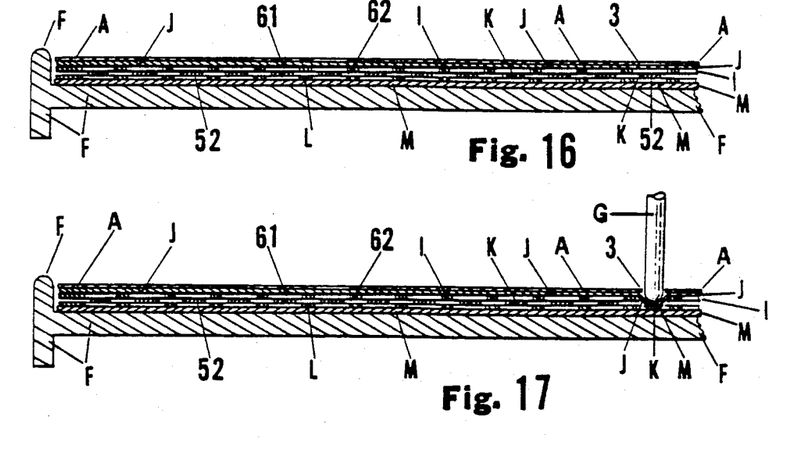
FIG. 16 is a top to bottom cross sectional view along broken line H—H' in FIG. 15, which shows the positional relationships of some of the component parts of this fourth variation.
FIG. 17 is identical to FIG. 16, except that it shows a stylus being pushed downward at a response area in an instructional sheet to press the electroconductive and elastic top sheet against first one conductive strip which is in turn pressed against a conductive strip in the lower set of conductive strips.
Figure 18:
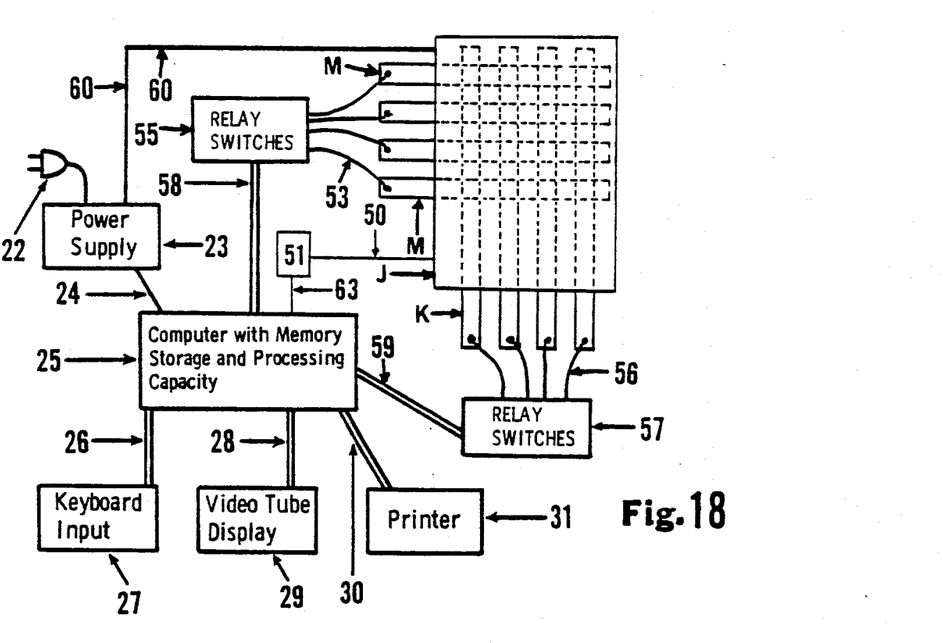
FIG. 18 is a schematic diagram of this fourth variation of this invention, and shows the connecting relationships of the various electrical components.

FIGS. 16, and 17 are cross sectional views along broken line H—H' in FIG. 15. FIG. 18 is a schematic view that shows the relationships of the various electrical, or electroconductive components of this fourth variation of this invention.

FIGS. 15, 16, 17, and 18; illustrate how this fourth variation is similar to the first, second, and third variations of this invention, and also illustrate how this fourth variation is different. Only the differences will be described in the following paragraph that describes this fourth variation of this invention.

FIGS. 15, 16, 17, and 18; show that the primary feature of this fourth variation of this invention is that the top elastic sheet of material J, is electroconductive and carries a low voltage current which is transmitted to underlying conductive strips K, and M, when a stylus G, is pushed downward through a response area 3, in instructional sheet A. Nonconductive sheet I, has a grid of through holes 61. Nonconductive sheet L, has a grid of through holes 52. Grids of through holes 61 and 52, have the same centers as do response areas 3, and as do the two sets of conductive strips K and M. Nonconductive sheet I is sandwiched between elastic and conductive sheet J, and elastic and conductive strips K. Nonconductive sheet L, is sandwiched between elastic and conductive strips K, and conductive strips M. To obtain its source of power, elastic and conductive sheet J, may be linked directly to power supply 23 by wire 60, or may be linked to power spply 23 indirectly by way of wires 50, 63, and 24 and by relay 51 and computer 25. The essential feature of this invention, the flexion of a conductive strip to contact an underlying conductive material, occurs with a stylus G, first deflects conductive sheet J, and with continued downward pressure, stylus G then deflects an elastic and conductive strip K through a through hole 52 to contact an underlying conductive strip M, which is permanently attached to holding frame F. The first switching action occurs when sheet J, contacts a conductive strip K; the second switching action occurs when an elastic and conductive strip K is pushed downward by stylus G, to contact a conductive strip M. These two switching actions determine the site of the response area 3, that are chosen by the student. This information is fed to computer 25, by wires 53 and 56; relay switches 55 and 57; and by cables 58 and 59. This information is then processed in a manner identical to the manner of processing that is given in variations one, two, and three, by computer 25, and related hardware, software, and electrical linkages.

What is claimed as new in this invention is:

1. A teaching and testing apparatus that provides students with immediate feedback as to the correctness or incorrectness of their responses to true-false, multiple choice, or cross matching questions and answers by the use of: a computer and related hardware and software, said computer and related hardware being electrically linked with said teaching and testing apparatus; where said teaching and testing apparatus incorporates two different sets of conductive strips; said two different sets of conductive strips having the individual conductive strips in each set arranged in the same plane; and where the two sets of conductive strips are organized in two different but parallel planes, with one set of conductive strips being located above the other; and where instructional or testing sheets containing a variety of indicia and response areas are positioned in a third plane that is above and parallel to the two preceeding planes; and where downward pressure at any response area on or in a testing or an instructional sheet causes a deflection of one of the conductive strips in one of the sets of conductive strips, said deflection resulting in a switching action that relays information to the computer, which in conjunction with other information tells the computer which response area on or in a testing or instructional sheet was responded to by the student, said computer having been previously programmed to operate in a teaching mode and to know which response areas are correct responses and which are incorrect response areas; and after evaluating this particular response, the computer sends information back to the student as to the correctness or incorrectness of this particular response on this particular instructional sheet.

2. The invention as claimed in claim 1, wherein said computer is programmed to also operate in a testing mode to give the instructor the results of the student's performance when so directed by the instructor.

3. The invention as claimed in claim one, where the strip that is deflected downward to contact an underlying conductive material, contacts another conductive strip that is one of a set of conductive strips that underlies the top set of flexible conductive strips.

4. The invention as claimed in claim one, where both sets of conductive strips are flexible, and where downward pressure at a response area on or in an instructional or testing sheet causes first deflection of one of the strips in the top set to contact an underlying conductive sheet, and where continued downward pressure at the same response area then causes a deflection of one of the flexible and conductive strips in the second and underlying set of conductive strips to contact a second conductive sheet that underlies this second set of conductive strips; this combined downward deflection of two conductive strips resulting in two switching actions that precisely locates the site where the downward pressure occurred.

5. The invention as claimed in claim one, where the conductive strips in the top set of strips are flexible, and where downward pressure at a response area results in a deflection of one of these flexible and conductive strips; and where this deflected conductive strip contacts a deformable elastic and conductive sheet to complete the first switching action, and where continued downward pressure at this response area causes this deformable and elastic conductive sheet to be deflected downward to contact one of the conductive strips in the second set of conductive strips, there by closing a second circuit that results in a second switching action, these two switching actions precisely locating the response area on the instructional or testing sheet at which downward pressure was exerted.

6. The invention as claimed in claim one, where underlying the testing or instructional sheet is first an elastic and conductive sheet that is linked to the computer, and that when this sheet is deflected downward at a response area in or on a testing or instructional sheet, this downward pressure causes the elastic and conductive sheet to contact a flexible and conductive strip in the top set of strips, and that continued downward pressure at this site causes this flexible and conductive strip to be deflected downward to contact a second conductive strip in an underlying set of conductive set of strips, there by conducting an electric current from the top conductive sheet to first one of the flexible and conductive strips in the top set of conductive strips, and then carrying this current to one of the strips in the bottom set of conductive strips, there by closing two circuits which results in two switching actions which precisely locate the response area at which the downward pressure was exerted.

7. The invention as claimed in claim one, where the computer hardware includes, but is not limited to: one or more keyboard or other input mechanisms; sound feedback mechanisms including an articulated voice that tells the student about his performance and makes encouraging comments; one or more video tube display mechanisms; and one or more printers.

8. The invention as claimed in claim one, where computer software includes but is not limited to: programs that contain knowledge as to which response areas on an instructional or testing sheet are correct answer areas, and which are incorrect answer areas, said programs being modifiable so that different programs contain different patterns as to which response areas are correct response areas, and which response areas are incorrect response areas; programs that contain a memory store that with the aid of appropriate direction from input sources identify each student and each student's performance on each instructional sheet; programs that analyze the pattern of a student's correct and incorrect responses, and feed back to the instructor information as to the students level of performance, areas of defieiency, and need to remediate these deficient areas, and can direct the student and teacher to the next appropriate instructional sequences; and programs that can compile information on one student, or one or more groups of students for administrative or research purposes.

9. The invention as claimed in claim one, where the teaching machine component of this invention is constructed so that the two different sets of strips have the individual sets of strips arranged in parallel rows, and where the two different sets of strips form a grid pattern.

10. The invention as claimed in claim one, where the teaching machine component of this invention contains two sets of strips, one set above the other, and where the pattern of arrangement of the two sets of strips does not form a grid pattern.

11. The invention as claimed in claim one, where one or more of the conductive strips in one or both sets of conductive strips, are not straight strips, but are curved, "V" shaped, zig-zag, or undulating.

* * * * *